(12) United States Patent
Liu et al.

(10) Patent No.: US 12,528,176 B2
(45) Date of Patent: Jan. 20, 2026

(54) POWER TOOL AND CONTROL METHOD THEREOF

(71) Applicant: JIANGSU DONGCHENG TOOLS TECHNOLOGY CO., LTD., Nantong (CN)

(72) Inventors: Xiaolei Liu, Nantong (CN); Wenxun Xiao, Nantong (CN); Hongjian Fei, Nantong (CN); Jian Zhang, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 53 days.

(21) Appl. No.: 18/401,504

(22) Filed: Dec. 31, 2023

(65) Prior Publication Data

US 2024/0139930 A1    May 2, 2024

Related U.S. Application Data

(63) Continuation of application No. PCT/CN2023/103423, filed on Jun. 28, 2023.

(30) Foreign Application Priority Data

Jun. 8, 2022 (CN) .......................... 202210639356.4
Oct. 18, 2022 (CN) .......................... 202211272990.5

(51) Int. Cl.
*B25F 5/02* (2006.01)
*B25F 5/00* (2006.01)

(52) U.S. Cl.
CPC ................ *B25F 5/02* (2013.01); *B25F 5/001* (2013.01)

(58) Field of Classification Search
CPC ............. B23B 45/02; B25F 5/02; B25F 5/001
See application file for complete search history.

(56) References Cited

U.S. PATENT DOCUMENTS 3,783,955 A * 1/1974 Gill .......................... B25F 3/00
    144/48.5
4,810,916 A * 3/1989 McBride ................ B25B 21/00
    310/83

(Continued)

FOREIGN PATENT DOCUMENTS

CN    106041836 A    10/2016
CN    106891302 A    6/2017

(Continued)

OTHER PUBLICATIONS

Chinese First Office Action, Chinese Application No. 202210639356. 4, mailed Jul. 17, 2023 (13 pages).

(Continued)

*Primary Examiner* — Michelle Lopez

(57) ABSTRACT

The present disclosure relates to a power tool and a control method thereof. The power tool includes a drive assembly, a first output portion, a second output portion, a switching assembly to be operated by a user, an identification unit, a control unit, and a control assembly to be triggered by the user. The switching assembly switches one of the first output portion and the second output portion to be connected to the drive assembly, and the identification assembly identifies a working mode of the power tool. In response to a first working mode, the control unit controls the first control assembly to be in an effective state, and the control unit controls an operating state of the first output portion according to a signal input by the first control assembly; in response to a second working mode, the control unit controls the first control assembly to be in an ineffective state.

19 Claims, 11 Drawing Sheets

(56) References Cited

U.S. PATENT DOCUMENTS

| | | | |
|---|---|---|---|
| 5,035,354 A | 7/1991 | Meyer | |
| 5,149,230 A * | 9/1992 | Nett | B25F 3/00 81/57.32 |
| 2004/0141818 A1 * | 7/2004 | Kuhn | B25F 5/02 408/35 |
| 2012/0183365 A1 | 7/2012 | Rozycki et al. | |
| 2017/0216999 A1 | 8/2017 | Cheng | |
| 2019/0210208 A1 * | 7/2019 | Codiga | B08B 9/021 |

FOREIGN PATENT DOCUMENTS

| | | |
|---|---|---|
| CN | 110524493 A | 12/2019 |
| CN | 110877324 A | 3/2020 |
| CN | 111098267 A | 5/2020 |
| CN | 112894724 A | 6/2021 |
| CN | 215548419 U | 1/2022 |
| CN | 114074312 A | 2/2022 |
| CN | 114750114 A | 7/2022 |
| CN | 114888761 A | 8/2022 |
| CN | 114986452 A | 9/2022 |
| CN | 114986453 A | 9/2022 |
| CN | 115741599 A | 3/2023 |
| JP | 2011177796 A | 9/2011 |
| JP | 2015066635 A | 4/2015 |
| JP | 2019063923 A | 4/2019 |
| KR | 200383038 Y1 | 4/2005 |

OTHER PUBLICATIONS

International Search Report, International Application No. PCT/CN2023/103423, mailed Sep. 19, 2023 (16 pages).

Chinese Second Office Action, Chinese Application No. 202211272990.5, mailed Jun. 20, 2025 (11 pages).

Chinese First Office Action, Chinese Application No. 202211272990.5, mailed Jan. 22, 2025 (19 pages).

Chinese Notification to Grant Patent Right for Invention, Chinese Application No. 202210639356.4, mailed Oct. 11, 2023 (5 pages).

* cited by examiner

POWER TOOL AND CONTROL METHOD THEREOF

CROSS REFERENCE

The present application is a continuation of International Patent Application No. PCT/CN2023/103423, filed on Jun. 28, 2023, which claims priority of Chinese Patent Application No. 202211272990.5, filed on Oct. 18, 2022, and No. 202210639356.4, filed on Jun. 8, 2022, the entire contents of which are hereby incorporated by reference in its entirety.

TECHNICAL FIELD

The present disclosure relates to the technical field of power tools, and in particular to a power tool and a control method thereof.

BACKGROUND

Power tool is a kind of machine which is driven by a motor to run an output part of the power tool to work on a workpiece. According to different kinds of the output part, the power tool can realize many different functions such as fastening, cutting, polishing, sanding, drilling, etc., which meets the diversified needs of the user. In a family DIY handmade-creation scenario, there are often occasions when two tools are frequently used, such as frequent use of a screwdriver (for fastening) and an electric grinder (for sanding) for wood processing, for which the user has to go back and forth to pick up the two tools, which is very inconvenient to use; in addition, the purchase of the two tools undoubtedly increases the cost of the user; multiple tools will take up more space, which is also unfavorable for the user.

At present, there appears on the market a power tool adapted to multiple working heads, the working heads are of different kinds for realizing different functions, and the user can switch the working heads according to the demand. In this way, the user can realize at least two of the above functions by using one tool, and the purchasing cost is reduced and it is convenient for the user to use, which solves the above-mentioned user demand.

A housing of the power tool is arranged with a user-triggered control assembly, such as a start switch and a rotational speed setting button, and a controller obtains an input signal from the control assembly to control the operation of the motor. For the multiple working heads on the power tool as described above, a set of user-triggered independent control assemblies are respectively arranged on the housing of the power tool to separately control the operation of the motor and the tool under different functions. However, it is easy for the control assemblies to be mistakenly triggered, leading to chaotic and ineffective control of the functions, or even safety problems.

SUMMARY OF THE DISCLOSURE

In response to the shortcomings of the related art, the present disclosure provides a power tool including a drive assembly, a first output portion, a second output portion, a switching assembly to be operated by a user, an identification unit, a control unit, and a control assembly to be triggered by the user; wherein the drive assembly is configured to provide a driving force for driving the first output portion and the second output portion to work; the switching assembly is movable under an operation from the user to switch between a first position and a second position; in response to the switching assembly being in the first position, the drive assembly and the first output portion are in a connection state, and the drive assembly and the second output portion are in a disconnection state, in which case the power tool is in a first working mode; in response to the switching assembly being in the second position, the drive assembly and the first output portion are in a disconnection state, and the drive assembly and the second output portion are in a connection state, in which case the power tool is in a second working mode; the identification unit is connected to the control unit, and the control unit is configured to identify a working mode of the power tool according to a position of the switching assembly identified by the identification unit; the control assembly comprises a first control assembly, the control unit being connected to the first control assembly; in response to the control unit identifying that the power tool is in the first working mode, the control unit controls the first control assembly to be in an effective state, and the control unit controls an operating state of the first output portion according to a signal input by the first control assembly; in response to the control unit identifying that the power tool is in the second working mode, the control unit controls the first control assembly to be in an ineffective state.

The present disclosure further provides a power tool, including: a housing; a motor assembly received in the housing; a first transmission assembly connected to an end of the motor assembly; a second transmission assembly connected to another end of the motor assembly; a switch assembly arranged in the housing; and a switch locking structure connected to the switch assembly; wherein the switch locking structure has a first position for unlocking and a second position for locking; wherein in the first position, the switch assembly is not blocked by the switch locking structure and the switch assembly activates the drive assembly; in the second position, the switch assembly is blocked by the switch locking structure and is not electrically connected to the motor assembly; wherein the power tool further includes a switching assembly connecting the first transmission assembly and the second transmission assembly; the switch locking structure is connected to the switching assembly; the switching assembly is movable between the first transmission assembly and the second transmission assembly, for driving the switch locking structure to move between the first position and the second position; wherein the switch locking structure includes a pivot member connected to the switching assembly and a locking member connected to the pivot member; the pivot member includes a pivot body connected to the housing, and includes a first rib and a second rib radially protruding outwardly from an outer periphery of the pivot body; the first rib is connected to the switching assembly, and the second rib is connected to the locking member.

BRIEF DESCRIPTION OF THE DRAWINGS

Specific embodiments of the present disclosure are described in further detail below in conjunction with the accompanying drawings.

DETAILED DESCRIPTION

Figure 1:
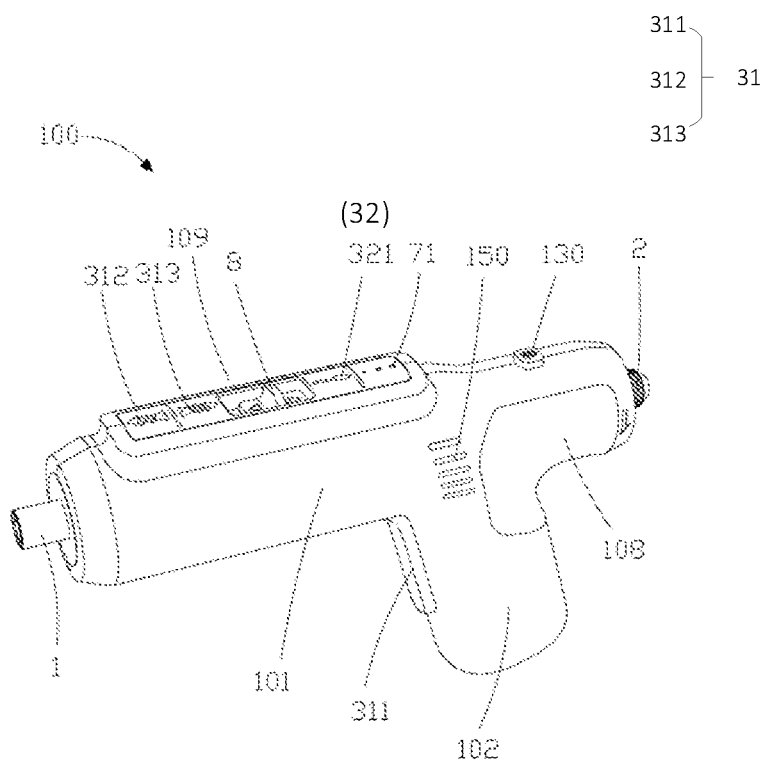
FIG. 1 is a schematic view of an overall structure of a power tool according to a first embodiment of the present disclosure.

The present disclosure is described in further detail below in connection with the accompanying drawings and embodiments.

Referring to FIGS. 1 to 22, the present disclosure provides a power tool 100 with multiple output portions/working heads, including a drive assembly 4 (also referred to a motor assembly), a first output portion 1, a second output portion 2, a user-operated switching assembly 8, an identification unit 5, a control unit 6, and a user-triggered control assembly.

The drive assembly 4 is configured to provide a driving force for driving the first output portion 1 and the second output portion 2 to work. The drive assembly 4 may be a motor, or a hydraulic motor, a pneumatic motor, or other driving means.

The first output portion 1 and the second output portion 2 have different functions to realize one of the functions including but not limited to fastening, cutting, polishing, sanding, and drilling, respectively. The power tool 100 includes a first working head 300 and a second working head 400 that are in different kinds; the first working head 300 is arranged on the first output portion 1, and the second working head 400 is arranged on the second output portion 2. With the above design, a corresponding working head realizing a corresponding function can be mounted to a corresponding output portion and operate under the driving of the output portion to act on a workpiece.

The switching assembly moves under an operation from the user to be in different positions, the positions including a first position and a second position, such that the switching assembly is capable of switching between the first position and the second position; when the switching assembly is in the first position, the drive assembly 4 and the first output portion 1 are in a connection state, and the drive assembly 4 and the second output portion 2 are in a disconnection state, in which case the power tool 100 is in a first working mode; when the switching assembly is in the second position, the drive assembly 4 and the first output portion 1 are in a disconnection state, and the drive assembly 4 and the second output portion 2 are in a connection state, in which case the power tool 100 is in a second working mode. The user can switch the working mode by operating the switching assembly, such that the power tool 100 is in one of the first working mode and the second working mode. In the first working mode, when working, the drive assembly 4 can only drive the first output portion 1 connected thereto move and work, and there is a mechanical disconnection between the drive assembly 4 and the second output portion 2, such that the second output portion 2 cannot be driven. In the second working mode, when working, the drive assembly 4 can only drive the second output portion 2 connected thereto to move and work, and there is a mechanical disconnection between the drive assembly 4 and the first output portion 1, such that the first output portion 1 cannot be driven. The user selects the working mode of the power tool 100 with multiple working heads through the switching assembly, to select the output portion that is desired to work.

The control unit 6 is configured to control an operating state of the drive assembly 4, such as starting, stopping, rotating speed, steering, etc. of the drive assembly 4. The control unit 6 includes a controller.

The control assembly is connected to the control unit 6. When the user triggers the control assembly, the control assembly transmits a signal to the control unit 6, and the control unit 6 thereby responsively controls the operating state of the drive assembly 4. As a result, the control unit 6 can change the operating state of the drive assembly 4 according to the user's demand, thereby controlling the operation of the first output portion 1 and the second output portion 2. The control assembly includes, but is not limited to, a start/stop switch, a speed setting button, and a torque setting button. As is known to those skilled in the art, the control unit 6 includes a storage unit storing a control program, and the control unit 6 may further automatically control the operating state of the drive assembly 4 according to the control program.

The identification unit 5 is connected to the control unit 6, and the control unit 6 is configured to identify the working mode of the power tool 100 according to a position of the switching assembly identified by the identification unit 5.

In some embodiments, the control assembly includes a user-triggered first control assembly 31, and the control unit 6 is connected to the first control assembly 31; when the control unit 6 identifies that the power tool 100 is in the first working mode, the control unit 6 controls the first control assembly 31 to be in an effective state, and the control unit 6 controls the operating state of the first output portion 1 according to a signal inputted by the first control assembly 31; when the control unit 6 identifies that the power tool 100 is in the second working mode, the control unit 6 controls the first control assembly 31 to be in an ineffective state.

In other embodiments, the control assembly includes a user-triggered first control assembly 31, a user-triggered second control assembly 32, and the control unit 6 is connected to the first control assembly 31 and the second control portion assembly. When the control unit 6 identifies that the power tool 100 is in the first working mode, the control unit 6 controls the first control assembly 31 to be in an effective state, controls the second control assembly 32 to be in an ineffective state, and controls the operating state of the first output portion 1 according to a signal inputted by the first control assembly 31; when the control unit 6 identifies that the power tool 100 is in the second working mode, the control unit 6 controls the first control assembly 31 to be in an ineffective state, controls the second control assembly 32 to be in an effective state, and controls the operating state of the second output portion 2 according to a signal input by the second control assembly 32.

The control unit 6 controlling a control assembly to be in an effective state means that the control unit 6 obtains a signal transmitted by the control assembly and performs a corresponding control; the control unit 6 controlling a control assembly to be in an ineffective state means that the controller does not obtain the signal, or obtains the signal while does not perform the corresponding control, and the user's trigger does not work for the power tool 100.

The power tool 100 of the present disclosure employs a software method that makes it possible for the user to select a certain working mode/output portion while the control assemblies corresponding to the remaining working modes/output portions are disabled, thereby avoiding the control assemblies being triggered by mistake and avoiding the possibility of causing:

1. A problem that the function control of the output portion is confusing and ineffective. For example, the working condition of the first working head 300 is drilling at a slow rotational speed, the first control assembly 31 is a rotational speed setting switch to set the output rotational speed of the first output portion 1 to 200 rpm; and the working condition of the second output portion 2 is grinding at a rotational speed of up to 5 Krpm, the second control assembly 32 is a rotational speed setting switch to set the output rotational speed of the second output portion 2 to 5 Krpm. In this case, when the user switches the power tool 100 to be in the second working mode while the user mistakenly triggers the first control assembly 31, the second output portion 2 will grind at a low speed. That is, the control of the function is confused, the efficiency is low, and the user will think that the tool is broken. Vice versa, when the user switches the power tool 100 to be in the first working mode while the user mistakenly triggers the second control assembly 32, the first output portion 1 will drill at a high speed. That is, the control of the function is confused, the working surface is damaged, the speed is out of control, and the user will likewise think that the tool is broken.
2, Safety issues. For example: the first control assembly 31 and the second control assembly 32 are start-stop switches, and the user wants to use the first output portion 1 but mistakenly switches the power tool 100 to the second working mode. In this case, when the user triggers the first control assembly 31 (i.e., mistakenly triggers a control assembly that does not correspond to the current working mode of the power tool 100), the second output portion 2 mistakenly start working. Since the user originally wants to use the first output portion 1 and does not pay attention to whether the second output portion 2 is in a safe position, the mis-starting of the second output portion 2 may cause damage to workpieces and objects, or may cause injury to the human body.

The above software scheme proposed by the present disclosure ensures that the multiple working modes of the power tool 100 with multiple working heads/output portions do not interfere with each other, with stable performance and high safety.

Further, the first control assembly 31 includes a user-operated first start-stop switch for controlling the start and stop of the drive assembly 4, and the second control assembly 32 includes a user-operated second start-stop switch for controlling the start and stop of the drive assembly 4. In this way, the present disclosure correspondingly avoids the safety problem caused by the above-mentioned false triggering of the control assembly.

Further, the first control assembly 31 includes a user-operated first parameter setting member for controlling operating parameters of the drive assembly 4; the second control assembly 32 includes a user-operated second parameter setting member for controlling the operating parameters of the drive assembly 4. The operating parameters include at least one of steering, rotational speed, current, voltage, and torque. In this way, the present disclosure correspondingly avoids the problem of chaotic and ineffective control of the function of the output portion caused by the above-mentioned false triggering of the control assembly.

The switching assembly further has a third position, and when the switching assembly is in the third position, the drive assembly 4 and the first output portion 1 are in the disconnection state, and the drive assembly 4 and the second output portion 2 are in the disconnection state. When the control unit 6 identifies that the switching assembly is in the third position, the control unit 6 controls the first control assembly 31 and the second control assembly 32 to be in the ineffective state. When the user is operating the switching assembly movement, there may be a deviation, such that the switching assembly is not placed in the first position or the second position, in which case the drive assembly 4 is in a mechanical disconnection state with any one of the output portions. If the control assembly is triggered, the drive assembly 4 will be started and idled, i.e., any one of the output portions will not be running and working, and the user will only hear the sound emitted by the operation of the drive assembly 4, which on the one hand wastes the energy and on the other hand, the user may mistakenly think that the tool is damaged. Base on above, in the present disclosure, the position of the switching assembly is set to include an effective position and an ineffective position corresponding to the effective position, the effective position being a position at which the drive assembly 4 and one of the output portions are in the connection state, such as the first and second positions described above, and the ineffective position being a position at which the drive assembly 4 and all of the output portions are in a disconnection state (an inactive position). When in the ineffective position, i.e., the third position, the switching assembly causes all control assemblies to be in the ineffective state and cannot be triggered by mistake, thereby avoiding idling of the power tool 100, conserving energy, and improving the user experience.

Further, the power tool 100 includes a warning light connected to the control unit 6. When the control unit 6 identifies that the switching assembly is in the third position, it controls the warning light to work, thereby reminding the user that the switching assembly has not been operated in place and is in the ineffective position. The warning light operates for example by flashing, changing color, etc.

When the power tool 100 is in different working modes, the control unit 6 sends corresponding control signals to the drive assembly 4. As is known to those skilled in the art, the control unit 6 includes a storage unit storing a control program, and the storage program includes preset parameters, and the control unit 6 may further automatically control the operating state of the drive assembly 4 according to the control program. Accordingly, a first control program and a second control program are provided corresponding to different output portions in the present disclosure. When the power tool 100 is in a certain working mode, the control unit 6 calls the corresponding control program to control the drive assembly 4 to operate in accordance with the preset parameters.

In some embodiments, the first working mode is a screwdriver mode performed by the first output portion 1, and the second working mode is an electric grinding mode performed by the second output portion 2. In other embodiments, other combinations may be arranged, which will not be repeated, all falling within the scope of the present disclosure.

Further, the identification unit 5 includes a trigger member and a sensing member, the trigger member being arranged on the switching assembly; the sensing member is movable relative to the trigger member for sensing the trigger member and generating a sensing signal; the control unit 6 is connected to the sensing member, for receiving the sensing signal and identifying the position of the switching assembly according to the sensing signal.

Figure 23:
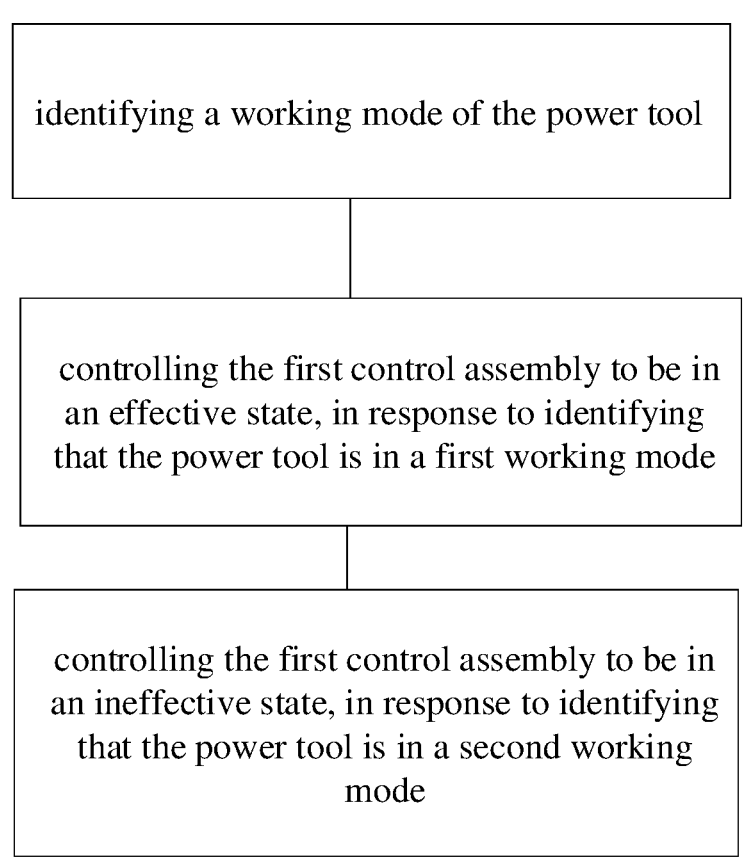
FIG. 23 is a flowchart of a control method of the power tool shown in FIG. 1.

Referring to FIG. 23, a control method of the power tool 100 is provided.

S1: identifying a working mode of the power tool 100;

S21: controlling the first control assembly 31 to be in an effective state, in response to identifying that the power tool 100 is in a first working mode;

S22: controlling the first control assembly 31 to be in an ineffective state, in response to identifying that the power tool 100 is in a second working mode.

The control method can be applied to all the power tools 100 with multiple working heads to obtain the technical effects of the multiple working modes not interfering with each other, stable performance, and high safety, which will not be repeated.

Referring to FIGS. 1 to 17, a specific technical solution of the present disclosure is described in detail with a first embodiment.

Referring to FIGS. 1 to 5, the first embodiment of the present disclosure relates to a double-ended power tool 100, the double-ended power tool 100 including a housing, a drive assembly 4 received in the housing, a first output portion 1 connected to an end of the drive assembly 4, a second output portion 2 connected to the other end of the drive assembly 4, a trigger 311 (also referred to a switch assembly) arranged on the housing, and a battery pack 200 connected to the housing; the battery pack 200 is configured to supply power to the drive assembly 4, for driving the first output portion 1 and the second output portion 2 to operate, and the battery pack 200 is a lithium battery pack that can be recharged cyclically.

In the present embodiment, the housing includes two symmetrically-arranged and concave half housings, the two half housings engaging together to define an inner space, and the drive assembly 4 and the battery pack 200 can be assembled into the inner space in a simple manner.

The housing includes a main body 101 extending in a front-to-back direction and substantially in the shape of a cylinder, and a grip portion 102 arranged at an angle relative to the main body 101. The drive assembly 4 is housed in the main body 101, and the first output portion 1 and the second output portion 2 are both extended to an outer side of the main body 101. The first output portion 1 is disposed at a front side of the main body 101, and the second output portion 2 is disposed at a rear side of the main body 101. That is, the first output portion 1 and the second output portion 2 are disposed at opposite ends of the main body 101, and the first output portion 1 and the second output portion 2 are disposed at opposite ends of the drive assembly 4, respectively. Further, the first working head 300 is arranged on the first output portion 1 and the second working head 400 is arranged on the second output portion 2, the first working head 300 and the second working head 400 being different from each other, such that the double-ended power tool 100 is capable of outputting two different working modes at the same time. The user only needs one tool to meet two usage needs, which greatly improves the user's product experience; integrating two tools in one product further reduces the storage space required by the user; and the two output portions are disposed at opposite ends of the main body 101, such that the first output portion 1 and the second output portion 2 are spaced apart, and they do not interfere with each other when working, which is highly safe.

Further, an axis of the first output portion 1 and an axis of the second output portion 2 are parallel to or coincide with each other.

Further, an angle between an axis of the grip portion 102 and the axis of the first output portion 1 is greater than or equal to an angle between the axis of the grip portion 102 and the axis of the second output portion 2. That is, the axis of the grip portion 102 and the axis of the first output portion 1 are arranged perpendicular to each other or inclined.

The trigger 311 and the battery pack 200 are both arranged at the grip portion 102, and the battery pack 200 is arranged in the grip portion 102 to reduce the size of the double-ended power tool 100, and also to make the whole machine more compact and smaller, and easy to maneuver; correspondingly, the grip portion 102 is arranged with a charging port 201 for charging the battery pack 200, and charging operation is carried out for the battery pack 200 through the charging port 201. The charging port 201 is disposed at a bottom of the grip portion 102 away from the main body 101, which makes the appearance of the whole machine tidier.

Figure 4:
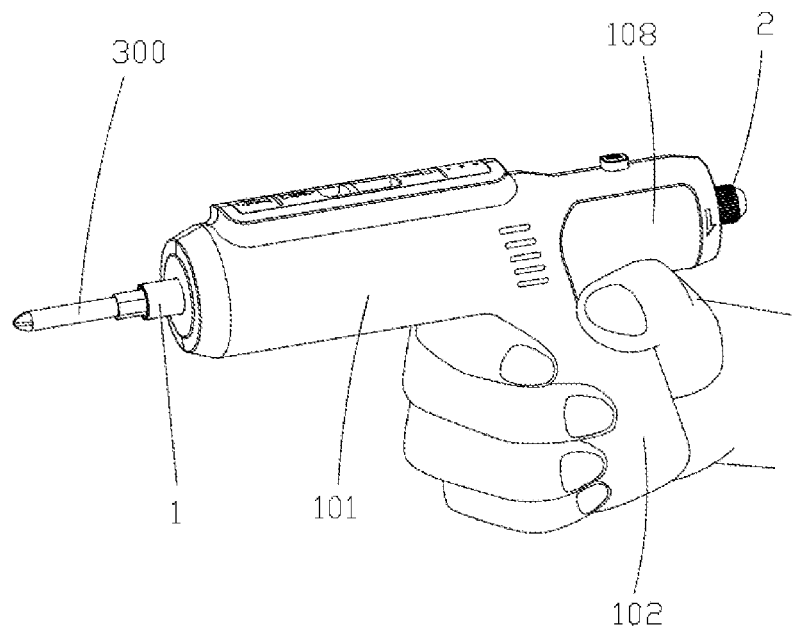
FIG. 4 is a schematic view of the power tool shown in FIG. 1 in a first state of use.
Figure 5:
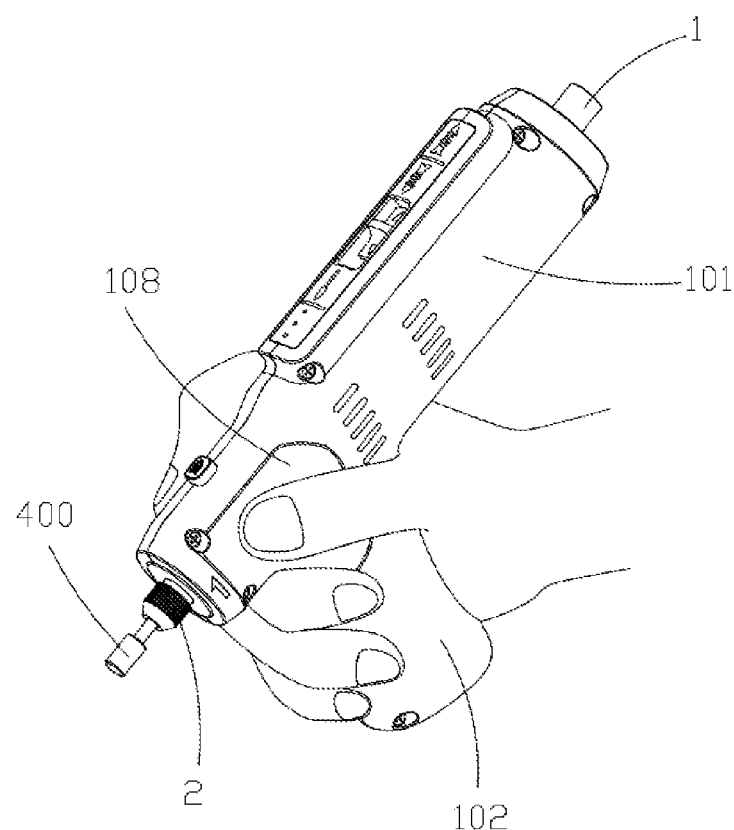
FIG. 5 is a schematic view of the power tool shown in FIG. 1 in a second state of use.

As shown in FIGS. 4 and 5, two user operation modes are provided herein, each of which corresponds to the manipulation of a different output portion. The double-ended power tool 100 includes a pressing area 108 for the user to touch, which is distributed on a side of the grip portion 102 and the main body 101 near the second output portion 2, and the trigger 311 is disposed on a side of the grip portion 102 toward the first output portion 1, i.e., the trigger 311 and the pressing area 108 are disposed on opposite sides of the grip portion 102.

Referring to FIG. 4 for a first operation mode, the first output portion 1 is arranged with the first working head 300; the first output portion 1 is a screwdriver output portion, and the first working head 300 is a screwdriver head; the first working mode of the power tool 100 is a screwdriver mode, where the first working head 300 is plugged in and mounted to the first output portion 1, for performing the fastening operation under the action of the drive assembly 4. In this case, the user holds the grip portion 102 by hand and presses the trigger 311 thereon to perform the operation.

Referring to FIG. 5 for as a second operation mode, the second output portion 2 is arranged with the second working head 400; the second output portion 2 is an electric grinding output portion, and the second working head 400 is an electric grinding head; the second working mode of the power tool 100 is an electric grinding mode, where the second working head 400 is plugged in and mounted to the second output portion 2, for performing the sanding operation under the action of the drive assembly 4. In this case, the user can firmly control the entire double-ended power tool 100 by holding the grip portion 102 by hand and pressing the index finger and thumb against the pressing area 108.

It is common knowledge to those skilled in the art that the first output portion 1 for the screwdriver outputs a torque value that is greater than the torque value output by the second output portion 2 for the electric grinder, according to the requirements of the working conditions. The rotational speed of the output of the first output portion 1 for the screwdriver is less than the rotational speed of the output of the second output portion 2 for the electric grinder.

It is to be understood that since the main body 101 is extended in a longitudinal elongate shape with an area for the user's hand to grip, the user can also work by holding the main body 101 directly instead of through the grip portion 102.

In the embodiments, in the front-to-back direction of the extension of the main body 101, a distance between the axis of the grip portion 102 and an end of the first output portion 1 is greater than a distance between the axis of the grip portion 102 and an end of the second output portion 2, i.e., the grip portion 102 is disposed on a side of the main body 101 far away from the first output portion 1 and close to the second output portion 2. Since the first output portion 1 is a screwdriver, the first output portion 1 shakes more when the operation is carried out, the grip portion 102 being far away from the first output portion 1 may make the balance of the tool better, such that the user is more comfortable to operate, not easy to fatigue, and it is convenient for the user to use the tool in a narrow and long space; and the second output portion 2 is an electric grinder, and the grip portion 102 is close to the second output portion 2, which is conducive to the user to carry out the fine sanding operation.

Figure 18:
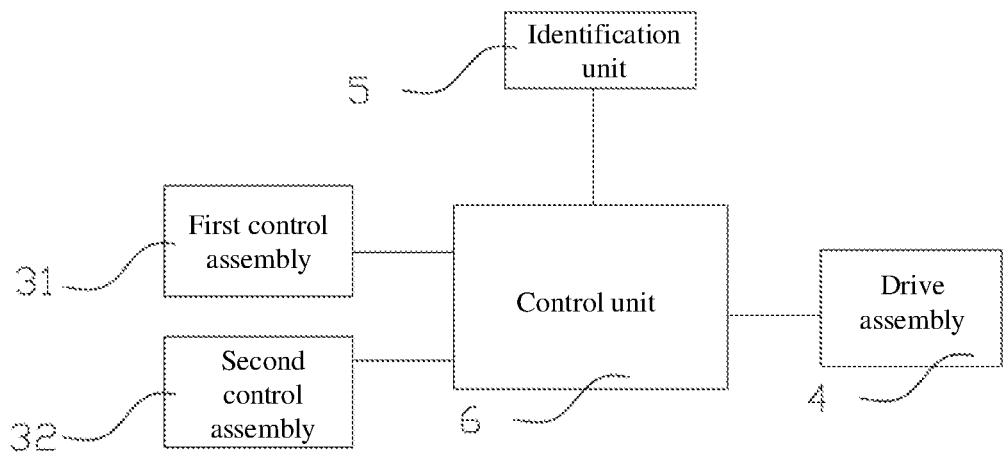
FIG. 18 is a control principle diagram of the power tool of the present disclosure.
Figure 19:
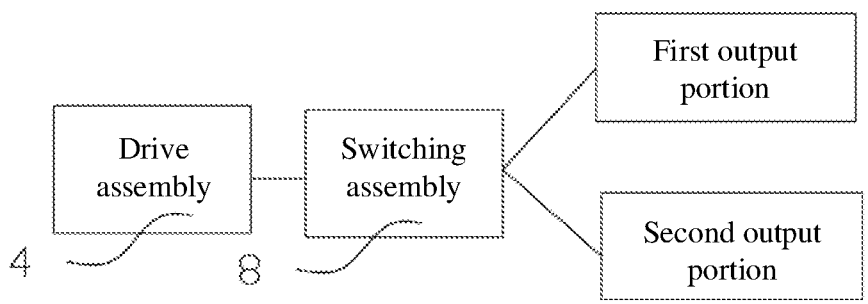
FIG. 19 is a structural principle diagram of the power tool of the present disclosure for realizing switching of working modes.
Figure 20:
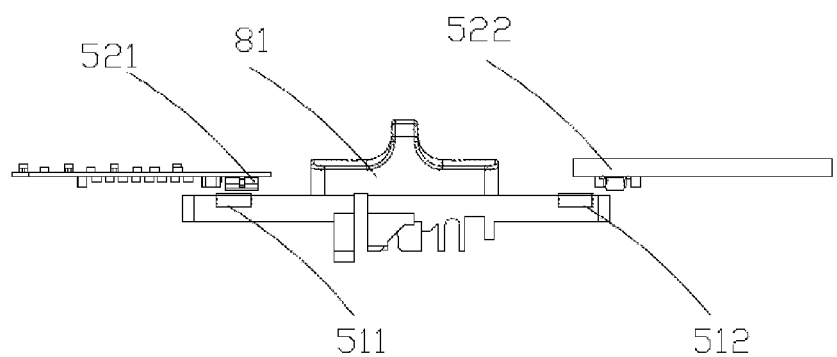
FIG. 20 is a structural schematic view of an identification unit of the power tool shown in FIG. 1.

Referring to FIGS. 6 to 13, the drive assembly 4 is a motor received in the main body 101. The power tool 100 further includes a first transmission assembly 10 connected between the motor and the first output portion 1, a second transmission assembly 20 connected between the motor and the second output portion 2, and a switching assembly 8 connected to the first transmission assembly 10 and the second transmission assembly 20; where the first transmission assembly 10 and the second transmission assembly are disposed at both ends of the motor, and the first output portion 1 and the second output portion 2 are disposed at both sides of the switching assembly 8. The switching assembly 8 is configured to control the motor to selectively drive the first output portion 1 through the first transmission assembly 10 or drive the second output portion 2 through the second transmission assembly 20. That is, the double-ended power tool 100 has a first working mode and a second working mode for operation by the user. In the first working mode/screwdriver mode, the first output portion 1 is operated and the second output portion 2 is not operated. In the second working mode/electric grinding mode, the second output portion 2 is operated and the first output portion 2 is not operated. The user manipulates the switching assembly 8 to switch between the first working mode and the second working mode. By arranging the switching assembly 8 between the first transmission assembly 10 and the second transmission assembly 20, only one of the first output portion 1 and the second output portion 2 can be operated when the double-ended power tool 100 is used, which greatly enhances the safety of the user. Referring to FIGS. 18-19, the double-ended power tool 100 includes a control system for controlling the operation of the power tool 100, where the control system is connected to a control unit 6 of the drive assembly 4 and a control assembly connected to the control unit 6. The control unit 6 is arranged on a circuit board 9, the circuit board 9 being received within the grip portion 102; and the control assembly is arranged on an outside of the housing to be triggered by manual operation from the user, so as to transmit an input signal to the control unit 6, and the control unit 6 controls an operating state of the motor based on the signal.

The control assembly includes a first control assembly 31 for the first output portion 1 and a second control assembly 32 for the second output portion 2. The first control assembly 31 includes a forward-rotation button 312, a reverse-rotation button 313, and the trigger 311 as described above, and the second control assembly 32 includes an electric grinding button 321. The forward-rotation button 312, the reverse-rotation button 313, the trigger 311, and the electric grinding button 321 are all connected to the control unit 6.

The forward-rotation button 312 is a forward setting and three-gear speed adjustment knob, in which pressing the knob once sets the motor to forward, and pressing the knob several times switches the rotational speed of the motor between three gears, namely, low-speed forward-rotation, medium-speed forward-rotation, and high-speed forward-rotation; the reverse-rotation button 313 is a reverse setting and full-speed setting knob, in which pressing the knob once sets the motor to reverse and the speed to the full-speed gear. The trigger 311 is the aforementioned first start-stop switch in the screwdriver mode. The first parameter setting member includes the forward-rotation button 312 and the reverse-rotation button 313.

The electric grinding button 321 is a start-stop switch and a three-gear speed adjustment knob, in which pressing the knob several times switches the motor between four gears, namely, low-speed start, medium-speed start, high-speed start, and off. That is, the second start-stop switch and the second parameter setting member described above in the present disclosure are integrated in a single user-operated trigger member, i.e., the electric grinding button 321.

The trigger 311 is arranged on a shell of the grip portion 102. The main body 101 of the power tool 100 includes a main body housing, the main body housing being arranged with a user operation area 109, and the forward-rotation button 312, the reverse-rotation button 313, and the electric grinding button 321 are disposed in the user operation area 109.

Referring to FIGS. 4-5, the above two operation modes correspond to the manipulation of different output portions. Since the trigger 311 is disposed in the grip portion 102, the trigger 311, which is used in the first operation mode, will necessarily be pressed under the second operation mode.

The power tool further includes an indication module, the indication module including a screwdriver forward-rotation indicator light, a screwdriver reverse-rotation indicator light, an electric grinding indicator light, and a gear indicator light 71. The screwdriver forward-rotation indicator light, the screwdriver reverse-rotation indicator light, and the electric grinding indicator light are each an LED, which is arranged on a corresponding one of the forward-rotation button 312, the reverse-rotation button 313, and the electric grinding button 321, and is lit when the corresponding one is triggered. The gear indicator light 71 includes three LED lights, the main body housing is further arranged with an indication area 110, and the three LED lights are arranged in the indication area 110 and arranged side by side in a front-to-back direction for indicating the gear of the rotation speed of the motor in the screwdriver mode and the electric grinding mode. For example, the screwdriver mode being in the low-speed forward-rotation, medium-speed forward-rotation, and high-speed forward-rotation corresponds to one light, two lights, and three lights of the gear indicator light 71 being illuminated, respectively; the screwdriver mode being in the reverse full-speed rotation corresponds to three lights of the gear indicator light 71 being illuminated; the electric grinding mode being in the low-speed start, medium-speed start, high-speed start corresponds to one light, two lights, and three lights of the gear indicator light 71 being illuminated, respectively.

The power tool 100 further includes the identification unit 5. Specifically, the trigger member of the identification unit 5 includes a first trigger member 511 corresponding to the first output portion 1 and a second trigger member 512 corresponding to the second output portion 2; and the sensing member of the identification unit 5 includes a first sensing member 521 corresponding to the first output portion 1, and a second sensing member 522 corresponding to the second output portion 2. When the switching assembly is in the first position, the first trigger member 511 triggers the first sensing member 521, the second sensing member 522 is not triggered, and the control unit 6 receives a first sensing signal from the first sensing member 521 to identify that the switching assembly is in the first position; when the switching assembly is in the second position, the second trigger member 512 triggers the second sensing member 522, the first sensing member 521 is not triggered, and the control unit 6 receives a second sensing signal from the second sensing member 522 to identify that the switching assembly is in the second position.

The switching assembly 8 includes a user-operated switching knob 81 and a connection assembly connected to the switching knob 81; the switching knob 81 is arranged on the main body housing, and the user operates the switching knob 81 to switch the switching assembly between the first position and the second position; the connection assembly is received inside the main body housing, and the switching knob 81 is configured to drive the connection assembly to move, such that the drive assembly 4 is selectively connected to the first output portion 1 or the second output portion 2 through the connection assembly.

Figure 15:
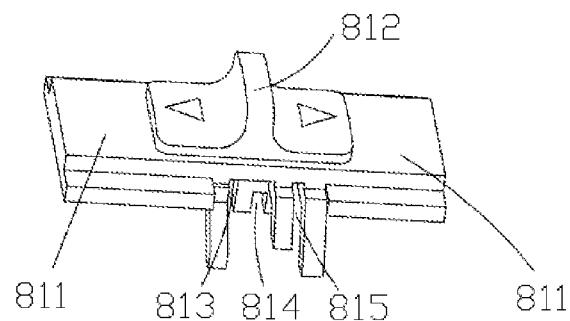
FIG. 15 is a structural schematic view of a switching knob in the power tool shown in FIG. 6.
Figure 16:
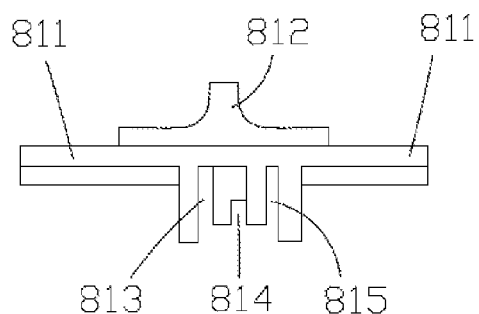
FIG. 16 is a structural schematic view of the switching knob shown in FIG. 9 in another viewing angle.

Specifically, referring to FIGS. 15-16, the switching knob 81 is a sliding member, and the main body housing correspondingly defines a sliding groove 103. The user can toggle the sliding member to slide left and right within the sliding groove 103. The first trigger member 511 and the second trigger member 512 are respectively arranged at both ends of the switching knob 81, and move synchronously with the switching knob 81. The first sensing member 521 and the second sensing member 522 are arranged on an inner side of the main body housing. When the switching knob 81 is slid to a leftmost end, the switching assembly is in the first position, triggering the first sensing member 521. When the switching knob 81 is slid to a rightmost end, the switching assembly is in the second position, triggering the second sensing member 522. When the switching knob 81 is slid but is not in the first position or in the second position, the switching knob 81 is in the third position, and the first sensing member 521 and the second sensing member 522 are not triggered, and the power tool 100 is in a non-operational mode. That is, only one of the first sensing member 521 and the second sensing member 522 is triggered, and the control unit 6 can receive only one of the first sensing signal and the second sensing signal, thereby identifying whether the power tool 100 is in the first working mode or the second working mode.

In some embodiments, the sensing member is a Hall sensor and the triggering member is a magnetic member.

The control system of the power tool 100 further includes a power-up self-locking circuit for the power module (battery pack). When the tool has not been used for a long time, the power-up self-locking circuit powers itself down, switches an external power supply line of the battery pack, and thus the control unit 6 is also powered down, such that the tool has no power consumption, saving energy. When the user triggers a certain switch, the power-up self-locking circuit is activated, and the power system supplies power to the control unit 6 and locks the power supply, until the tool has not been used for a long time and the power-up self-locking circuit is self-powered down. It will be understood by those skilled in the art that the power-up self-locking circuit of the power module of the power tool 100 is common knowledge and will not be repeated herein.

Further, when the tool is in a state of no power consumption, when the user triggers any one of the trigger 311, forward-rotation button 312, reverse-rotation button 313, and electric grinding button 321 to activate the power-up self-locking circuit, the control unit 6 obtains the power supply and operates. In this case, the control unit 6 first detects the working mode of the power tool 100 identified by the identification unit 5; and when it is identified that the power tool 100 is in the first working mode, the control unit 6 controls the trigger 311, the forward-rotation button 312, and the reverse-rotation button 313 to be in an effective state, and controls the electric grinding button 321 to be in an ineffective state; when it is identified that the power tool 100 is in the second working mode, the control unit 6 controls the trigger 311, the forward-rotation button 312, and the reverse-rotation button 313 to be in an ineffective state, and controls the electric grinding button 321 to be in an effective state; when it is identified that the power tool 100 is in a non-working mode, the control unit 6 controls the trigger 311, the forward-rotation button 312, the reverse-rotation button 313, and the electric grinding button 321 to be in an ineffective state. The effective state and the deactivated state are as described above and will not be repeated.

In this way, it is ensured that the first control assembly 31 is used only in the first working mode and the second control assembly 32 is used only in the second working mode. In a first aspect, the situation, in which the trigger 311 is triggered in the electric grinding mode in FIG. 5 causing the electric grinding to be activated by mistake, is avoided. In a second aspect, the problem, that the steering and rotation speeds of the screwdriver mode are set confusingly with the steering and rotation speeds of the electric grinding mode causing the confusion and ineffectiveness of the control of the functions of the output portion, is avoided. In a third aspect, the safety problem as mentioned above is avoided. Specifically, referring to the working condition in FIG. 4, when the user wants to use the screwdriver, such as holding the grip portion 102 of the tool in the first working mode, the screwdriver is facing forward, and the electric grinder is close to the shoulder or chin of the human body. If the user mistakenly places the toggle switch in the second position and at that time presses the trigger 311, the electric grinder is triggered to rotate by mistake, and thus the electric grinder may damage the human body.

The structure of the switching assembly of the first embodiment will be described specifically below.

Referring to FIGS. 6 to 13, the motor includes a first motor shaft 41 extending toward a side of the first transmission assembly 10 and a second motor shaft 42 extending toward a side of the second transmission assembly 20, each of which is configured to output rotational power of the motor. The first transmission assembly 10 includes a first transmission portion 11 connected to the first output portion 1 and a first clutch member 12 movably connected to the first motor shaft 41 and the first transmission portion 11. The second transmission assembly 20 includes a second transmission portion 21 connected to the second output portion 2 and a second clutch member 22 movably connected to the second motor shaft 42 and the second transmission portion 21. The switching assembly 8 is connected between the first clutch member 12 and the second clutch member 22.

In the embodiments, the switching assembly 8 includes a switching knob 81 arranged on the main body 101 and a connection assembly connected to the switching knob 81, the connection assembly including a connecting plate 82 connected between the first transmission assembly 10 and the second transmission assembly 20, a first connecting member 83 connected to the first clutch member 12 and the switching knob 81, a second connecting member 84 connected to the switching knob 81 and the connecting plate 82, a third connecting member 85 connected to the connecting plate 82 and the second clutch member 22, and a fourth connecting member 86 connected to the first transmission portion and to the switching knob 81. The switching knob 81 is moved to drive the connecting plate 82, the first connecting member 83, the second connecting member 84, the third connecting member 85, and the fourth connecting member 86 to be moved together, for switching positions of the first clutch member 12 and the second clutch member 22.

Alternatively, the first connecting member 83 may be connected between the first clutch member 12 and the connecting plate 82, and movement of the switching knob 81 similarly drives movement of the first clutch member 12.

In some embodiments, the first connecting member 83, second connecting member 84, third connecting member 85, and fourth connecting member 86 are all steel wires.

Referring to FIGS. 7-13, the double-ended power tool 100 has the first working mode for driving the first output portion 1 and the second working mode for driving the second output portion 2. In the first working mode, the first drive portion 11 is connected to the first motor shaft 41 through the first clutch member 12, and the second drive portion 21 is disengaged from the second motor shaft 42; in the second working mode, the second drive portion 21 is connected to the second motor shaft 42 through the second clutch member 22, and the first drive portion 11 is disengaged from the first motor shaft 41.

In the embodiments, the first clutch member 12 includes a first recess 121 radially inwardly recessed from an outer periphery of the first clutch member 12, and the second clutch member 22 includes a second recess 221 radially inwardly recessed from an outer periphery of the second clutch member 22. An end of the first connecting member 83 is connected to the connecting plate 82 or the switching knob 81, and the other end of the first connecting member 83 is clamped in the first recess 121; an end of the third connecting member 85 is connected to the connecting plate 82, and the other end of the third connecting member 85 is clamped in the second recess 221.

Figure 13:
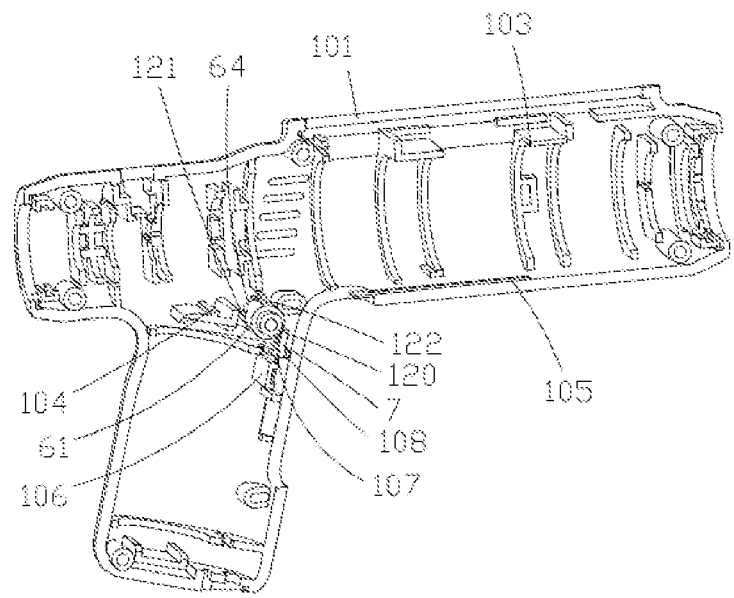
FIG. 13 is a schematic view of the switch locking structure of the power tool shown in FIG. 11 in the first working mode from another viewing angle.

Referring to FIG. 13, the switching knob 81 includes shoulder portions 811 disposed on the left and right sides, a toggle portion 812 disposed on an upper side of the shoulder portions 811, and a first groove 813, a second groove 814, and a third groove 815 disposed on a lower side of the shoulder portions 811. The toggle portion 812 protrudes out of the main body 101 to facilitate operation by the user. The second connecting member 84 is disposed in the first groove 813, the first connecting member 83 is disposed in the third groove 815, and the fourth connecting member 86 is disposed in the second groove 814.

The double-ended power tool 100 includes a slide groove 103 extending from an inner wall of the main body 101, the switching knob 81 is received in the slide groove 103, and the shoulder portions 811 can reciprocate within the slide groove 103.

In the embodiment, the fourth connecting member 86 is disposed between the first connecting member 83 and the second connecting member 84, and the fourth connecting member 86 is pressing biased toward the switching knob 81 to prevent the switching knob 81 from wobbling during operation.

Referring to FIGS. 6-FIG. 17, the first drive portion 11 includes a connecting post 111 projecting radially outwardly from an outer periphery of the first drive portion 11, and the second connecting member 84 includes an annular portion 841 sleeved on the connecting post 111. Further, the switching knob 81 and the connecting plate 82 are disposed on opposing sides above and below the motor, and the annular portion 841 is disposed at a position approximately midway between the switching knob 81 and the connecting plate 82. Movement of the switching knob 81 in the front-to-back direction drives the second connecting member 84 to pivot around the annular portion 841, which in turn drives the connecting plate 82 to move in the front-to-back direction.

Figure 17:
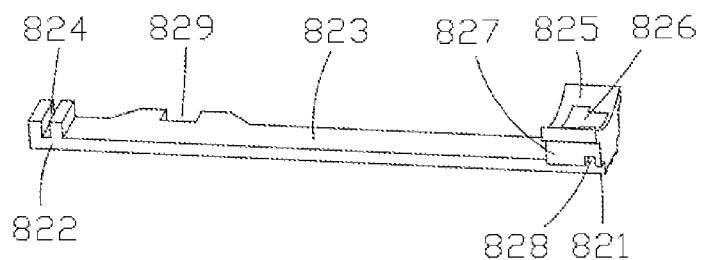
FIG. 17 is a structural schematic view of a connecting plate in the power tool shown in FIG. 6.

As shown in FIG. 17, the connecting plate 82 includes a base plate 823 extending in an axial direction of the motor, a first end 821 proximate to the first transmission assembly 10, a second end 822 proximate to the second transmission assembly 20, a guide seat 827 protruding from the first end 821 toward the first transmission assembly 10, a second catch 824 extending from the second end 822 toward the second transmission assembly 20, and a first catch 828 disposed on a side of the guide seat 827. The base plate 823 is connected between the first end 821 and the second end 822, the second connecting member 84 is clamped in the first catch 828, and the third connecting arranged 85 is mounted in the second catch 824.

Further, the double-ended power tool 100 includes a bearing portion 104, 105 extending from an inner wall of the main body 101, and the base plate 823 is supported on the bearing portion 104, 105 and movable along the bearing portion 104, 105. A guide surface 825 is arranged on an end surface of the guide seat 827 facing the first transmission assembly 10, and the shape of the guide surface 825 matches an outer peripheral surface of the first transmission assembly 10 to limit and guide the forward and backward movement of the connecting plate 82.

Further, the guide seat 827 includes a notch 826 recessed inwardly from an upper end surface of the guide surface 825. The notch 826 is defined to remove part of material used for the guide seat 827, which reduces the material cost of the connecting plate 82 while making the connecting plate 82 lightweight and lighter for the user when switching the working mode.

Combining FIGS. 7-13, in the embodiments, the first output portion 1 is a screwdriver, and the corresponding first transmission portion 11 is a planetary gear transmission structure; and the second output portion 2 is an electric grinding, and the corresponding second transmission portion 21 is an electric grinding output shaft; the drive assembly 4 further includes a shaft lock structure 130 connected to the second transmission portion 21. The shaft lock structure 130 is pressed to prevent the electric grinding output shaft from rotation, thereby facilitating the user to change the electric grinding head.

In the embodiments, the housing further includes an air inlet 140 and an air outlet 150 that are in communication with the internal space, and the drive assembly 4 further includes a fan connected to the motor. The external cooling air, under the action of the fan, enters into the internal space through the air inlet 140 and dissipates the heat of the drive assembly 4, which is subsequently discharged outwardly from the air outlet 150.

It is understood by those skilled in the art that the structure of the switching assembly is not limited to the manner of the above embodiments, and other switching assemblies that can realize the switching of working modes fall within the scope of the present disclosure and are not listed.

Second Embodiment

The second embodiment of the present disclosure provides a double-ended power tool 100 including an identification unit 5; the identification unit 5 includes a trigger member and a sensing member, the trigger member including a first magnetic member corresponding to the first output portion 1 and a second magnetic member corresponding to the second output portion 2; magnetic properties of the first magnetic member and the second magnetic member are reversed; the sensing member is a Hall sensor, which is configured for sensing a magnetic field strength and a magnetic field polarity of the first magnetic member or a magnetic field strength and a magnetic field polarity of the second magnetic member, and generating a corresponding sensing signal. When the Hall sensor senses a magnetic field and the magnetic field direction is positive, a first sensing signal is generated; and when the Hall sensor senses a magnetic field and the magnetic field direction is negative, a second sensing signal is generated. The control unit 6 is configured to identify whether the switching assembly is in a first position or a second position according to the received sensing signal, thereby identifying the working mode of the power tool.

It is understood by those skilled in the art that the structure of the switching assembly is not limited to the manner in the two embodiments of the present disclosure, and other identification units 5 that can realize the identification function all fall within the scope of the present disclosure and are not listed.

The drive assembly 4 of the second embodiment is received in the main body 101; the switching assembly is rotatably disposed at an end of the main body 101, and the first output portion 1 and the second output portion 2 are fixedly disposed in the switching assembly and disposed on the same side of the switching assembly; the switching assembly is rotated by a user operation and thereby switched between the first position and the second position, so as to make the drive assembly 4 selectively connectable to the first output portion 1 or the second output portion 2.

In the second embodiment, there is only one transmission assembly; the output shaft of the motor is connected to the transmission assembly, and the transmission assembly has an output end; the first output portion 1 includes a first input end, and the second output portion 2 includes a second input end; the switching assembly is a rotatable body, and the user can rotate the rotatable body to cause one of the first input end and second input end to be connected to the output end of the transmission assembly, and thus in connection with the drive assembly 4.

The second embodiment of the double-ended power tool 100 of the present disclosure is distinguished from the first embodiment in the overall shape, where the specific structure of the switching assembly, the motor output shaft, the transmission assembly, and the two output portions is different from that of the first embodiment, and the identification unit 5 is different from that of the first embodiment, and the rest of the parts are the same, and will not be repeated.

In some embodiments, the torque value outputted by the first output portion 1 is greater than the torque value outputted by the second output portion 2.

Further, the rotational speed outputted by the first output portion 1 is less than the rotational speed outputted by the second output portion 2.

Figure 2:
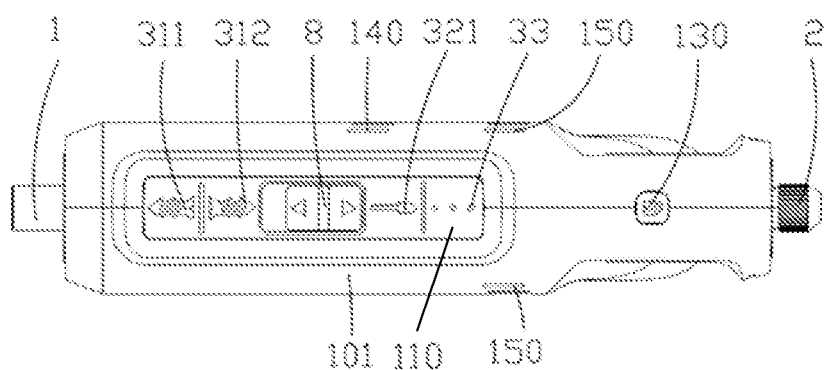
FIG. 2 is a top view of the power tool shown in FIG. 1.
Figure 3:
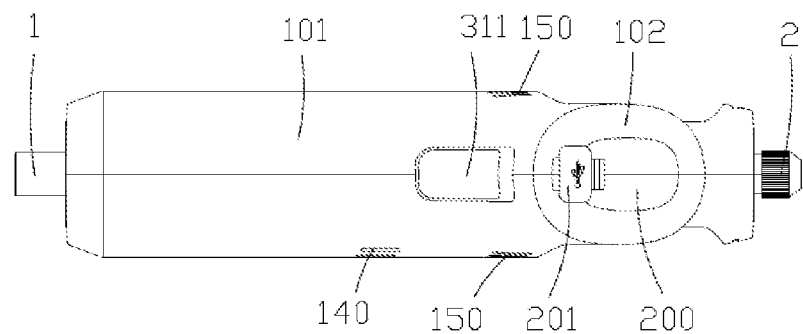
FIG. 3 is a bottom view of the power tool shown in FIG. 1.
Figure 6:
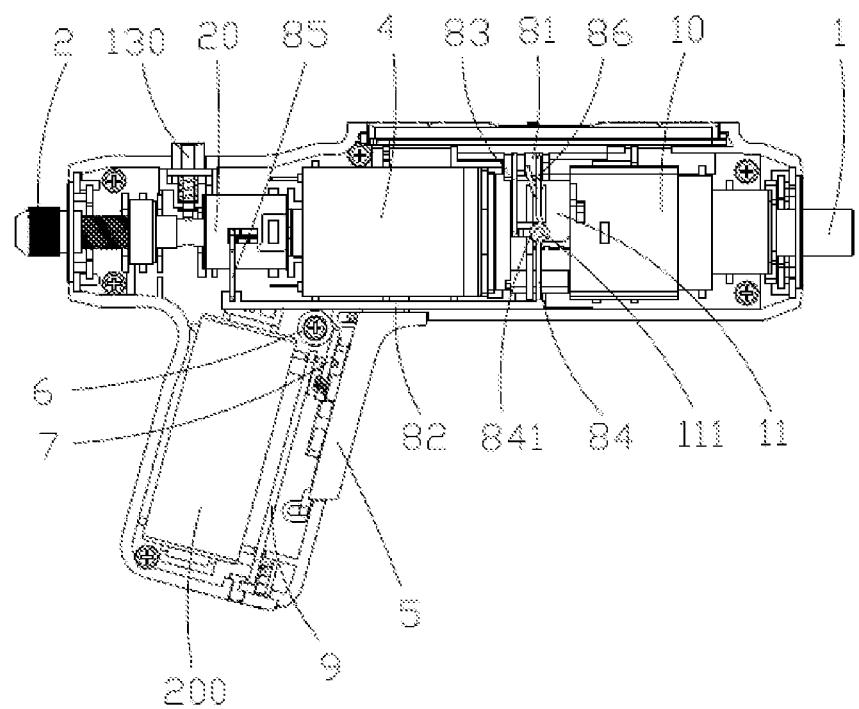
FIG. 6 is a schematic view of an internal structure of the power tool shown in FIG. 1 with half of a housing removed.
Figure 7:
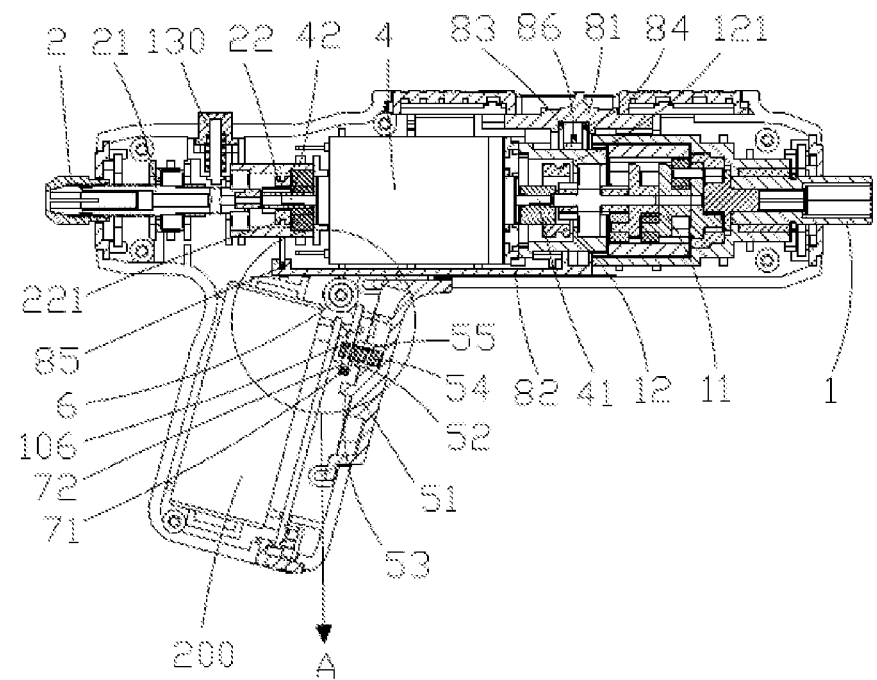
FIG. 7 is a schematic view of an exploded view of the power tool shown in FIG. 1 in a first working mode.
Figure 8:
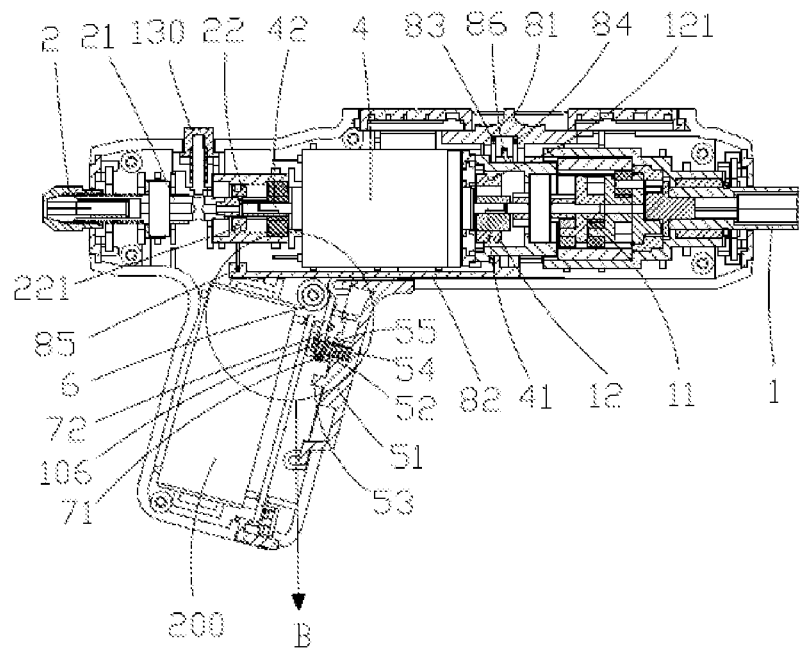
FIG. 8 is a schematic view of an exploded view of the power tool shown in FIG. 1 in a second working mode.
Figure 9:
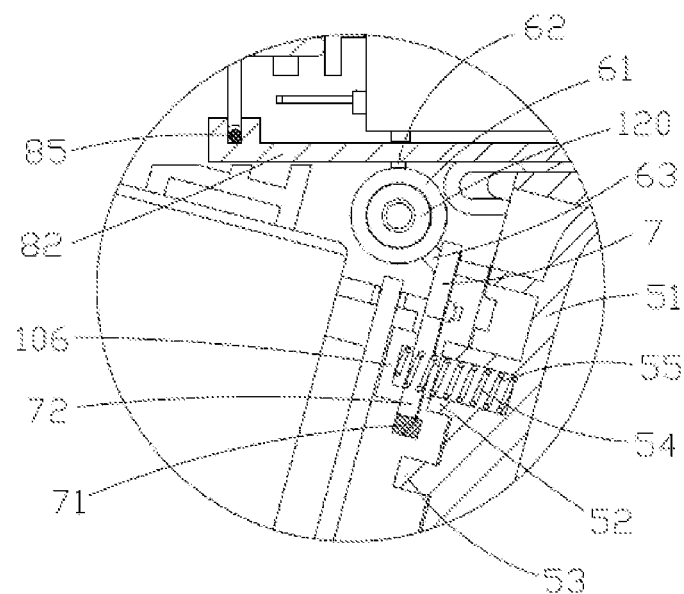
FIG. 9 is an enlarged view of area A in the power tool shown in FIG. 7.
Figure 10:
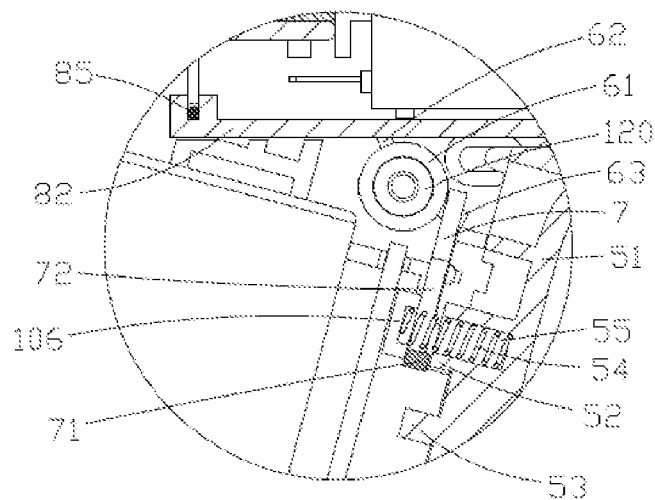
FIG. 10 is an enlarged view of area B in the power tool shown in FIG. 8.
Figure 11:
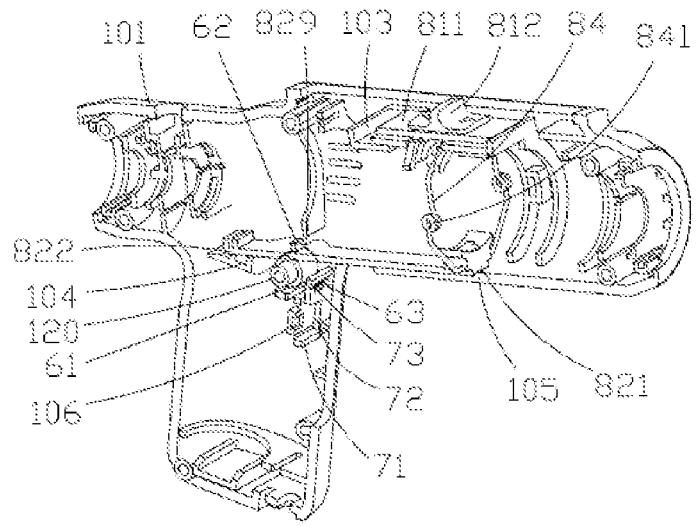
FIG. 11 is a schematic view of a switch locking structure of the power tool shown in FIG. 7 in the first working mode.
Figure 12:
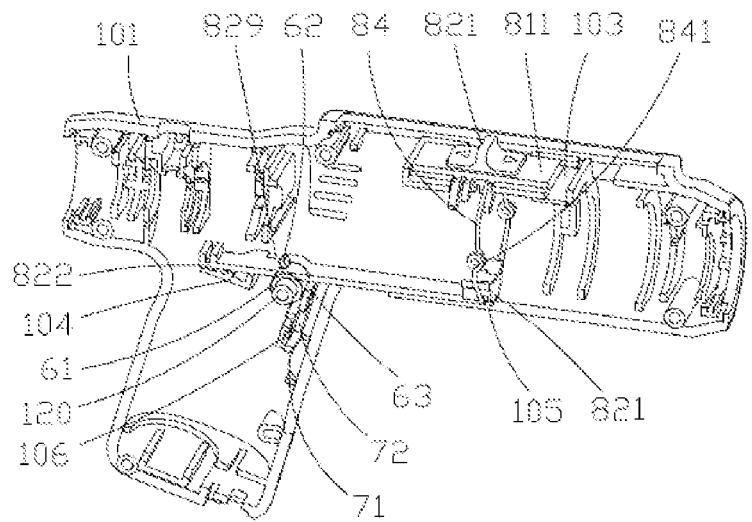
FIG. 12 is a schematic view of a switch locking structure of the power tool shown in FIG. 8 in the second working mode.

Referring to FIGS. 1, 2, and 6, the dual-head power tool 100 includes a circuit board 9 connected to the driving assembly and the control assembly connected to the circuit board 9, the circuit board 9 being received in the grip portion 102, and the control assembly being disposed on the main body 101; the trigger 311 is also connected to the circuit board 9 for controlling the starting and stopping of the driving assembly.

In the embodiments, the control assembly is configured to control the output parameters of the first output portion 1 and the second output portion 2; the control assembly includes the first control assembly 31 connected to the first output portion 1, and the second control assembly 32 connected to the second output portion 2; the first control assembly 31 is disposed in an area closer to the first output portion 1, and the second control assembly 32 is disposed in an area closer to the second output portion 2; the gear indicator light 71 is disposed between the second control assembly 32 and the second output portion 2, and the second control assembly 32 is disposed between the gear indicator light 71 and the first control assembly 31.

Further, the first control assembly 31 includes the forward-rotation button 312 and the reverse-rotation button 313 for controlling the first output portion 1, the forward-rotation button 312 being disposed between the first output portion 1 and the reverse-rotation button 313, the forward-rotation button 312 being a forward rotation and torque adjustment button, and the reverse-rotation button 313 being a reversal button, and pressing the reverse-rotation button 313 controls the first output portion 1 for reversal. The forward-rotation button 312 can be pressed for controlling the first output portion 1 to switch between forward rotation and a plurality of different preset torque values. The second control assembly 32 includes the electric grinding button 321 controlling the second output portion 2, and the electric grinding button 321 cam be pressed for controlling the second output portion 2 to switch between startup, shutdown, and a plurality of different preset torque values.

In other embodiments, the gear indicator light 71 is functionally variated, e.g., being replaced by a display lamp 33, which is electrically connected to the first control assembly 31 and the second control assembly 32, and is configured to display the output parameters of the first output portion 1 and the second output portion 2 to the user. The display lamp 33 includes three LED lamps arranged side-by-side in the front-to-back direction to display different parameters by the number of LED lamps lit. The illuminated number of LEDs of the display lamp 33 may further show the remaining power of the battery pack 200, and the change of the color of the display lamp 33 may show the state of the double-ended power tool 100 to the user, e.g., a green light indicates that the tool is in a normal state, and a red light indicates that the tool is in a malfunctioning state.

Referring to FIG. 1, the control assembly and grip portion 102 are disposed between the first output portion 1 and the second output portion 2; the control assembly is disposed on an upper side of the main body 101, and the grip portion 102 is disposed on a lower side of the main body 101; and in the front-to-back direction, the projections of the control assembly and the grip portion 102 on the main body 101 at least partially overlap, thereby shortening the length of the main body 101, facilitating the compactness and miniaturization of the double-ended power tool 100.

In some embodiments, the switching assembly 8 is disposed between the first control assembly 31 and the second control assembly 32 to space the first control assembly 31 and the second control assembly 32, thereby effectively preventing mis-operation by the user.

Referring again to FIGS. 6 to 14, the double-ended power tool 100 includes a switch locking structure connected to the trigger 311, the switch locking structure having an unlocked first position and a locked second position. In the first position, the trigger 311 is not blocked by the switch locking structure, and the trigger 311 is able to be normally pressed down and activate the drive assembly 4. In the second position, the trigger 311 is blocked by the switch locking structure, and the trigger 311 cannot be electrically connected to the drive assembly 4, such that the drive assembly 4 cannot be started. Further, the switch locking structure is connected to the switching assembly 8, and the switching assembly 8 moves between the first transmission assembly 10 and the second transmission assembly 20, driving the switch locking structure to move between the first position and the second position. In the first working mode, only the first output portion 1 operates, and the second output portion 2 does not operate; the switch locking structure is located in the unlocked first position, and the first output portion 1 can be triggered and operated normally by the trigger 311. In the second working mode, only the second output portion 2 operates, and the first output portion 1 is not required to be operated; the switch locking structure is located in the locked second position, and the user will not trigger by mistake even if he or she is holding the grip portion 102, which greatly improves the safety of use. Further, the position of the switch locking structure is moved with the movement of the switching assembly 8, and does not require additional parts for operation. That is, while moving the switching assembly 8 and driving the dual-ended power tool 100 to switch between the first working mode and the second working mode, the switch locking structure can also be driven to change its position, which makes it more convenient for users to use the switch locking structure.

Figure 22:
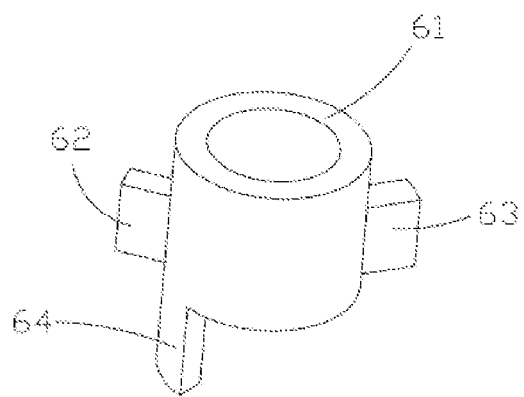
FIG. 22 is a structural schematic view of a pivot member in the power tool shown in FIG. 6.

In some embodiments, the switch locking structure includes a pivot member 6 connected to the connecting plate 82 of the switching assembly 8 and a locking member 7 connected to the pivot member 6. As shown in FIG. 22, the pivot member 6 includes a pivot body 61 connected to the housing, a first rib 62 and a second rib 63 radially protruding outwardly from an outer periphery of the pivot body 61, and a limit portion 64 protruding axially from an end portion of the pivot body 61 toward an inner wall of the housing. The first rib 62 and the second rib 63 are spaced apart from each other, the first rib 62 is connected to the connecting plate 82, and the second rib 63 is connected to the locking member 7; during the moving process of the connecting plate 82, the pivot body 61 is driven to rotate, and the pivot body 61 moves the locking member 7.

Referring again to FIGS. 9 and 10, the trigger 311 includes a switch unit arranged in the housing, a trigger element 51 connected to the housing, a bump 52 extending toward the locking member 7 from an end face of the trigger element 51, a trigger portion 53 connected to the switch unit, a resilient member 54 connected to the trigger element 51, and a housing slot 55 recessed inwardly from an end face of the bump 52; the housing includes a first wall 106 extending along an axis of the pivot body 61 from the inner wall, an end of the resilient member 54 is disposed in the housing slot 55 and the other end abuts against the first wall 106; further, the resilient member 54 extends between the first wall 106 and the trigger element 51 and passes through an avoidance portion 72, and the resilient member 54 is biased towards the trigger element 51.

Figure 21:
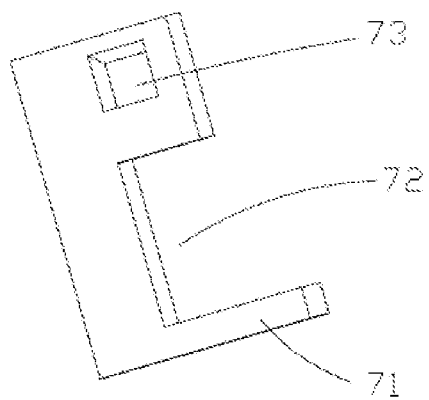
FIG. 21 is a structural schematic view of a locking member in the power tool shown in FIG. 6.

As shown in conjunction with FIG. 21, the locking member 7 includes a stop portion 71 corresponding to the bump 52, a second connecting groove 73 housing the second rib 63, and the avoidance portion 72 disposed between the second connecting groove 73 and the stop portion 71; the locking member 7 is disposed between the first wall 106 and the trigger element 51; when the switch locking structure is disposed in the second position, when the trigger element 51 is pressed down, the bump 52 abuts against the stop portion 71, and the trigger portion 53 cannot activate the switch unit, making the trigger 311 unable to activate the drive assembly 4; whereas when the switch locking structure is located in the first position, when the trigger element 51 is pressed down, the stopping portion 71 does not block the bump 52, and the bump 52 passes through the avoidance portion 72, driving the trigger portion 53 to activate the switch unit, thereby making the trigger 311 able to activate the drive assembly 4 normally.

Combining with FIG. 17, the connecting plate 82 includes a first connecting groove 829 housing the first rib 62; the movement of the connecting plate 82 drives the first rib 62 and the second rib 63 to rotate around the pivot body 61, thereby driving the locking member 7 to move between the first position and the second position.

Figure 14:
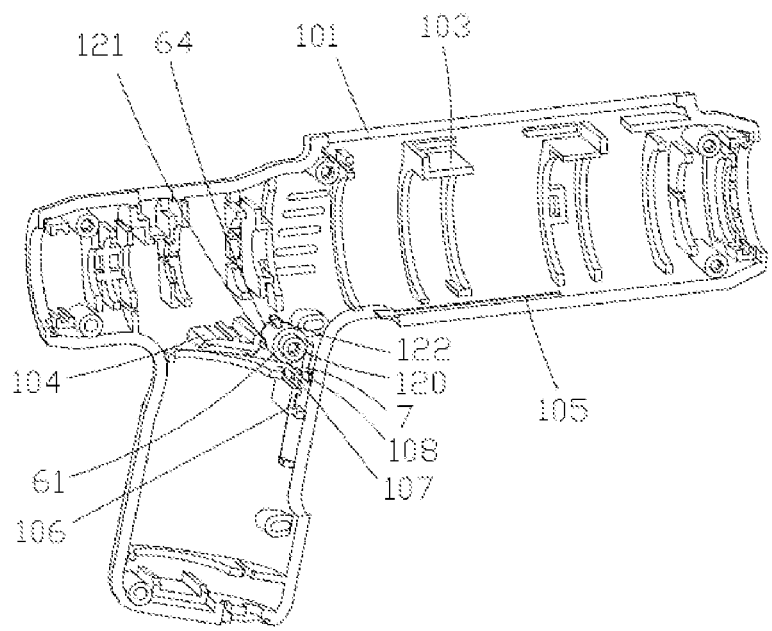
FIG. 14 is a schematic view of the switch locking structure of the power tool shown in FIG. 12 in the second working mode from another viewing angle.

Referring to FIGS. 13 and 14, the housing includes a pillar 120 extending along an axis of the pivot body 61 from the inner wall, and a first stopper 121 and a second stopper 122 protruding radially outwardly from an outer periphery of the pillar 120; the first stopper 121 and the second stopper 122 are spaced apart from each other; the pivot body 61 is sleeved on the outer periphery of the pillar 120, and the limit portion 64 is movable between the first stopper 121 and the second stopper 122 to limit the movement of the pivot member 6.

Further, the limit portion 64, the first stopper 121, and the second stopper 122 are all disposed between the inner wall of the housing and the pivot body 61.

In some embodiments, the housing further includes a second wall 107 and a third wall 108 extending from the inner wall along the axis of the pivot body 61, and the locking member 7 is disposed between the second wall 107 and the third wall 108 and oriented to the movement of the locking member 7 through the second wall 107 and the third wall 108.

By providing the switching assembly 8 between the first transmission assembly 10 and the second transmission assembly 20, only one of the first output portion 1 and the second output portion 2 is capable of working when the double-ended power tool 100 is used, which greatly enhances the safety of the user. The double-ended power tool 100 further includes the switch locking structure linked to the switching assembly 8, which enhances the safety of the user working in the second working mode; and the position of the switch locking structure moves with the movement of the switching assembly 8, which does not require an additional component for operation, and is more convenient for the user to use.

The present disclosure is not limited to the above specific embodiments. Those skilled in the art can easily understand that there are many alternatives to the power tool 100 of the present disclosure without departing from the principles and scope of the present disclosure. The scope of the present disclosure is subject to the contents of the claims.

What is claimed is:

1. A power tool, comprising: a drive assembly, a first output portion, a second output portion, a switching assembly to be operated by a user, an identification unit, a control unit, and a control assembly to be triggered by the user;
    wherein the drive assembly is configured to provide a driving force for driving the first output portion and the second output portion to work;
    the switching assembly is movable under an operation from the user to switch between a first position and a second position; in response to the switching assembly being in the first position, the drive assembly and the first output portion are in a connection state, and the drive assembly and the second output portion are in a disconnection state, in which case the power tool is in a first working mode; in response to the switching assembly being in the second position, the drive assembly and the first output portion are in a disconnection state, and the drive assembly and the second output portion are in a connection state, in which case the power tool is in a second working mode;
    the identification unit is connected to the control unit, and the control unit is configured to identify a working mode of the power tool according to a position of the switching assembly identified by the identification unit;
    the control assembly comprises a first control assembly, the control unit being connected to the first control assembly; in response to the control unit identifying that the power tool is in the first working mode, the control unit controls the first control assembly to be in an effective state, and the control unit controls an operating state of the first output portion according to a signal input by the first control assembly; in response to the control unit identifying that the power tool is in the second working mode, the control unit controls the first control assembly to be in an ineffective state;
    wherein the switching assembly further has a third position; in response to the switching assembly being in the third position, the drive assembly and the first output portion are in the disconnection state, and the drive assembly and the second output portion are in the disconnection state; in response to the control unit identifying that the switching assembly is in the third position, the control unit controls the first control assembly and the second control assembly to be in the ineffective state.

2. The power tool according to claim 1, wherein the control assembly further comprises a second control assembly, the control unit being connected to the second control assembly; in response to the control unit identifying that the power tool is in the first working mode, the control unit controls the second control assembly to be in an ineffective state; in response to the control unit identifying that the power tool is in the second working mode, the control unit controls the second control assembly to be in an effective state, and the control unit controls an operating state of the second output portion according to a signal input by the second control assembly.

3. The power tool according to claim 2, wherein the first control assembly comprises a first start-stop switch to be operated by the user, for controlling starting and stopping of the drive assembly; the second control assembly comprises a second start-stop switch to be operated by the user, for controlling starting and stopping of the drive assembly.

4. The power tool according to claim 2, wherein the first control assembly comprises a first parameter setting member to be operated by the user, for controlling an operating parameter of the drive assembly; the second control assembly comprises a second parameter setting member to be operated by the user, for controlling the operating parameter of the drive assembly.

5. The power tool according to claim 2, wherein the first control assembly comprises a forward-rotation button, a reverse-rotation button, and a trigger; and the second control assembly comprises an electric grinding button; the forward-rotation button, the reverse-rotation button, the trigger, and the electric grinding button are all connected to the control unit;
    the power tool further comprises: a first transmission assembly connected between the drive assembly and the first output portion, and a second transmission assembly connected between the drive assembly and the second output portion; wherein the switching assembly is connected to the first transmission assembly and the second transmission assembly; the first transmission assembly is disposed on an end of the drive assembly, and the second transmission assembly is disposed on another end of the drive assembly; the switching assembly is configured to control the drive assembly to selectively drive the first output portion through the first transmission assembly or drive the second output portion through the second transmission assembly.

6. The power tool according to claim 1, wherein the identification unit comprises a trigger member and a sensing member, the trigger member being arranged on the switching assembly; the sensing member is movable relative to the trigger member for sensing the trigger member and generating a sensing signal; the control unit is connected to the sensing member, for receiving the sensing signal and identifying the position of the switching assembly according to the sensing signal.

7. The power tool according to claim 6, wherein the trigger member comprises a first trigger member corresponding to the first output portion and a second trigger member corresponding to the second output portion; the sensing member comprises a first sensing member corresponding to the first output portion and a second sensing member corresponding to the second output portion; in response to the switching assembly being in the first position, the first trigger member triggers the first sensing member, the second sensing member is not triggered, and the control unit receives a first sensing signal from the first sensing member to identify that the switching assembly is in the first position; in response to the switching assembly is in the second position, the second trigger member triggers the second sensing member, the first sensing member is not triggered, and the control unit receives a second sensing signal from the second sensing member to identify that the switching assembly is in the second position.

8. The power tool according to claim 6, further comprising a main body; wherein the drive assembly is received in the main body; the first output portion is disposed on a first end of the main body, and the second output portion is disposed on a second end of the main body opposite to the first end; the first output portion is disposed on an end of the drive assembly, and the second output portion is disposed on another end of the drive assembly; the first output portion is disposed on a side of the switching assembly, and the second output portion is disposed on another side of the switching assembly.

9. The power tool according to claim 8, wherein the main body comprises a main body housing, and the switching assembly comprises a switching knob to be operated by the user and a connection assembly connected to the switching knob;
the switching knob is arranged on the main body housing and configured for the user to operate to switch the switching assembly between the first position and the second position;
the connection assembly is received in the main body housing, and the switching knob is configured to drive the connection assembly to move, for causing the drive assembly to be selectively connected to the first output portion or second output portion through the connection assembly.

10. The power tool according to claim 9, further comprising a grip portion connected to and arranged at an angle relative to the main body; wherein the first control assembly comprises a first start-stop switch to be operated by the user, for controlling starting and stopping of the drive assembly, the first start-stop switch being disposed on the grip portion; the second control assembly comprising a second start-stop switch to be operated by the user, for controlling starting and stopping of the drive assembly, the second start-stop switch being disposed on the main body.

11. A power tool, comprising:
a housing;
a motor assembly received in the housing;
a first transmission assembly connected to an end of the motor assembly;
a second transmission assembly connected to another end of the motor assembly;
a switch assembly arranged in the housing; and
a switch locking structure connected to the switch assembly;
wherein the switch locking structure has a first position for unlocking and a second position for locking; wherein in the first position, the switch assembly is not blocked by the switch locking structure and the switch assembly activates the drive assembly; in the second position, the switch assembly is blocked by the switch locking structure and is not electrically connected to the motor assembly;
wherein the power tool further comprises a switching assembly connecting the first transmission assembly and the second transmission assembly; the switch locking structure is connected to the switching assembly; the switching assembly is movable between the first transmission assembly and the second transmission assembly, for driving the switch locking structure to move between the first position and the second position;
wherein the switch locking structure comprises a pivot member connected to the switching assembly and a locking member connected to the pivot member; the pivot member comprises a pivot body connected to the housing, and comprises a first rib and a second rib radially protruding outwardly from an outer periphery of the pivot body; the first rib is connected to the switching assembly, and the second rib is connected to the locking member.

12. The power tool according to claim 11, wherein the switch assembly comprises a trigger element connected to the housing, and a bump extending toward the locking member from an end face of the trigger element; the locking member comprises a stop portion corresponding to the bump; in the second position, the bump abuts against the stop portion.

13. The power tool according to claim 12, wherein the locking member further comprises a second connecting groove housing the second rib, and an avoidance portion disposed between the second connecting groove and the stop portion; in the first position, the bump passes through the avoidance portion, for activating the motor assembly.

14. The power tool according to claim 13, wherein the switching assembly comprises a connecting plate connected between the first transmission assembly and the second transmission assembly, the connecting plate comprising a first connecting groove housing the first rib; the connecting plate is movable to drive the first rib and the second rib to rotate around the pivot body, for driving the locking member to move between the first position and the second position.

15. The power tool according to claim 13, wherein the switch assembly comprises a resilient member biasing the trigger element and a housing slot recessed inwardly from an end face of the bump; the housing comprises a first wall extending from an inner wall of the housing along an axis of the pivot body, and an end of the resilient member is disposed in the housing slot and another end of the resilient member abuts against the first wall.

16. The power tool according to claim 15, wherein the locking member is disposed between the first wall and the trigger element, and the resilient member extends between the first wall and the trigger element and through the avoidance portion.

17. The power tool according to claim 11, wherein the housing comprises a second wall and a third wall extending from an inner wall of the housing along an axis of the pivot body, the locking member being disposed between the second wall and the third wall.

18. The power tool according to claim 11, wherein the housing comprises a pillar extending from an inner wall of the housing along an axis of the pivot body, and a first stopper and a second stopper protruding radially outwardly from an outer periphery of the pillar; the pivot member comprises a limit portion protruding axially from an end portion of the pivot body, the pivot body is sleeved on the outer periphery of the pillar, and the limit portion is movable between the first stopper and the second stopper.

19. The power tool according to claim 18, wherein the limit portion, the first stopper, and the second stopper are disposed between the inner wall of the housing and the pivot body.

* * * * *